April 14, 1959 E. DAVIES ET AL 2,882,393

RECEIVER DISTORTION SUPPRESSION CIRCUIT

Filed Sept. 10, 1956 2 Sheets-Sheet 1

INVENTORS:
Eric Davies
and
Henryk Mirzwinski
BY: Baldwin & Wight
ATTORNEYS

April 14, 1959 E. DAVIES ET AL 2,882,393

RECEIVER DISTORTION SUPPRESSION CIRCUIT

Filed Sept. 10, 1956 2 Sheets-Sheet 2

INVENTORS:
Eric Davies
and
Henryk Mirzwinski
BY: Baldwin & Wight
ATTORNEYS 2,882,393

RECEIVER DISTORTION SUPPRESSION CIRCUIT

Eric Davies, Burnham on Crouch, and Henryk Mirzwinski, Chelmsford, England, assignors to Marconi's Wireless Telegraph Company Limited, London, England, a British company Application September 10, 1956, Serial No. 608,734

Claims priority, application Great Britain October 18, 1955

3 Claims. (Cl. 250—20)

Figure 1:
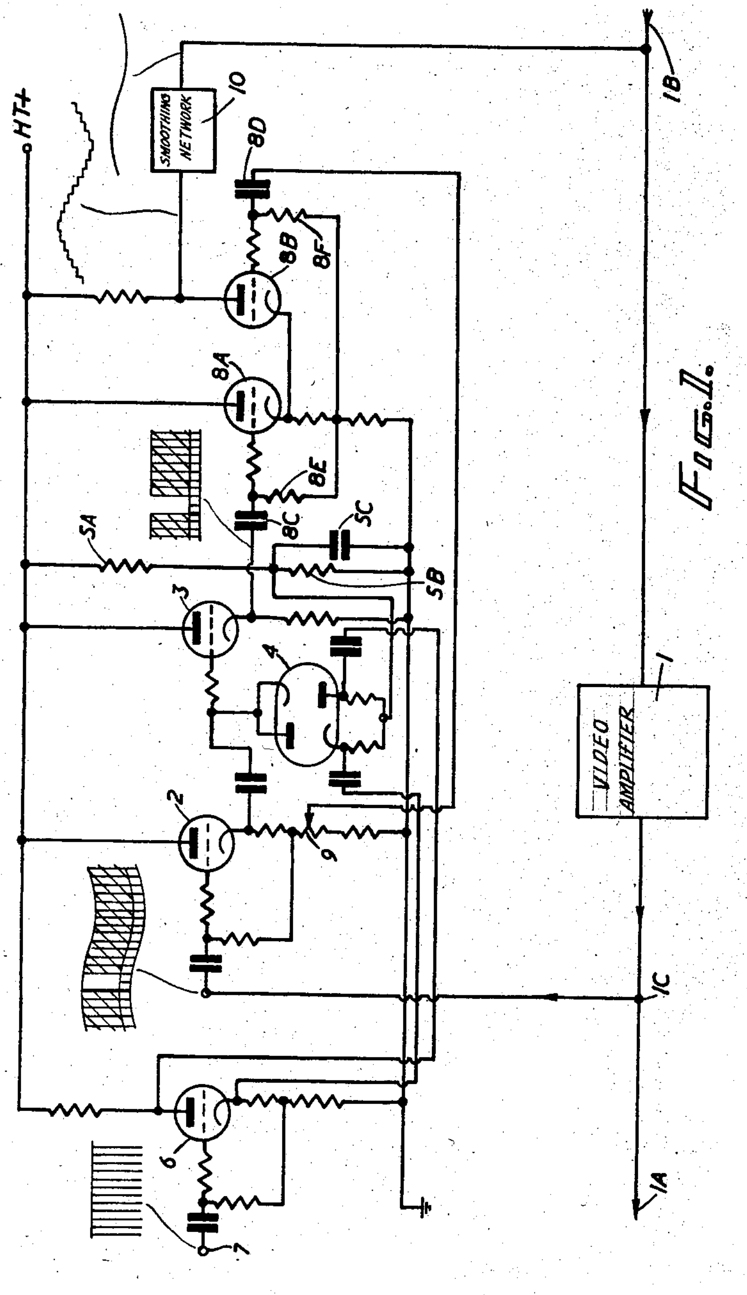

This invention relates to demodulating circuit arrangements and also to step-wave form generators. An important object of the invention is to provide improved means for reducing interference in television systems of the kind in which the television signal is required to be periodically brought to a fixed level.

Among the most troublesome forms of interference in television systems is low frequency interference produced by mains hum, and switching surges. When such interference is present in a television signal of the kind referred to modulation of the level (which should be constant), to which, inter alia, synchronizing pulses are referred, occurs with consequent distortion of the resultant television picture. Such interference is, of course, distinct from interference which may be present in the modulated wave envelope of the signals themselves. Generally similar distortion may also be produced in the television signal circuits themselves. In applicant's published British patent specification 732,677 circuits are described for reducing such distortion by deriving from the output of a portion of a television signal channel a correcting signal which is a function of the distortion actually produced and feeding it back to an earlier point in the channel in such a way that a degree of distortion cancellation is effected. However, these circuits, in common with other known circuits for accomplishing a similar result, suffer from several disadvantages and limitations.

The known circuits referred to above are such that phase shifting means need to be incorporated in the feed back path in order that the phase of the fed-back signal shall be such as to ensure proper interference cancellation i.e. shall be in exact phase opposition to the signal components to be cancelled. The use of such phase shifting means inevitably reduces the band-width of the feed back path. For example, in an installation in which the phase shift is of the correct value to eliminate 50 c./s. mains hum, the phase shift produced for 500 c./s. would be seriously wrong, so much so, indeed that the effect of interference at this frequency might actually be increased.

Furthermore, as most of the above known circuits derive the signal to be fed back by sampling at a relatively high rate, usually at line frequency in a television channel, integrating networks are usually necessary to ensure that the signal fed back shall have a high proportion of its energy at the frequency of the distortion to be eliminated and not at the sampling frequency and such networks introduce addition frequency-conscious phase shift and also attenuation.

An important object of the present invention is to reduce or eliminate the defects above mentioned.

As will be seen later the circuit arrangements provided by this invention for achieving the above object are such as to lend themselves to the production of improved step-wave generators of simple design and capable of providing a large range of step-wave outputs with the minimum of adjustment and a feature of the invention resides in the production of such generators.

According to the main feature of the present invention a demodulating circuit arrangement for the production of a signal representative of low frequency amplitude modulation present upon a signal of higher frequency comprises means for periodically clamping the modulated signal and means for subtractively combining the modulated signal with said clamped signal to produce a resultant stepped signal. The stepped signal thus obtained will approximate in wave form to the low frequency modulation.

Preferably said combining means comprises two thermionic valves connected as a cathode coupled pair, the modulated signal being fed to a control electrode of one valve and the clamped signal being fed to a control electrode of the other valve, the stepped, resultant signal being taken-off from the anode circuit of one of the valves. Obviously the frequency of clamping must be high in relation to the highest low frequency present.

In applying the invention to provide a distortion reducing or eliminating circuit arrangement for reducing or eliminating low frequency modulation produced by hum or other interference or low frequency circuit distortion, the stepped wave form is passed through a smoothing circuit so as substantially to remove the steps therein and the smoothed signal is fed back to a point preceding that where clamping is effected so as substantially to cancel out the distortion.

Preferably where the invention is applied to a television signal channel (its main application) the said clamping means is operated by line-frequency synchronizing pulses obtained from the television signals.

A stepped wave form generator in accordance with the invention comprises a low frequency source of predetermined wave form, a pulse source operating at a multiple of the frequency of the low frequency source, a clamping circuit actuated by pulses from the pulse source and connected to clamp the low frequency waves at the pulse frequency, means for subtractively combining the clamped low frequency waves with unclamped waves from the low frequency source and means for taking a stepped wave form from the combining circuit.

Figure 2:
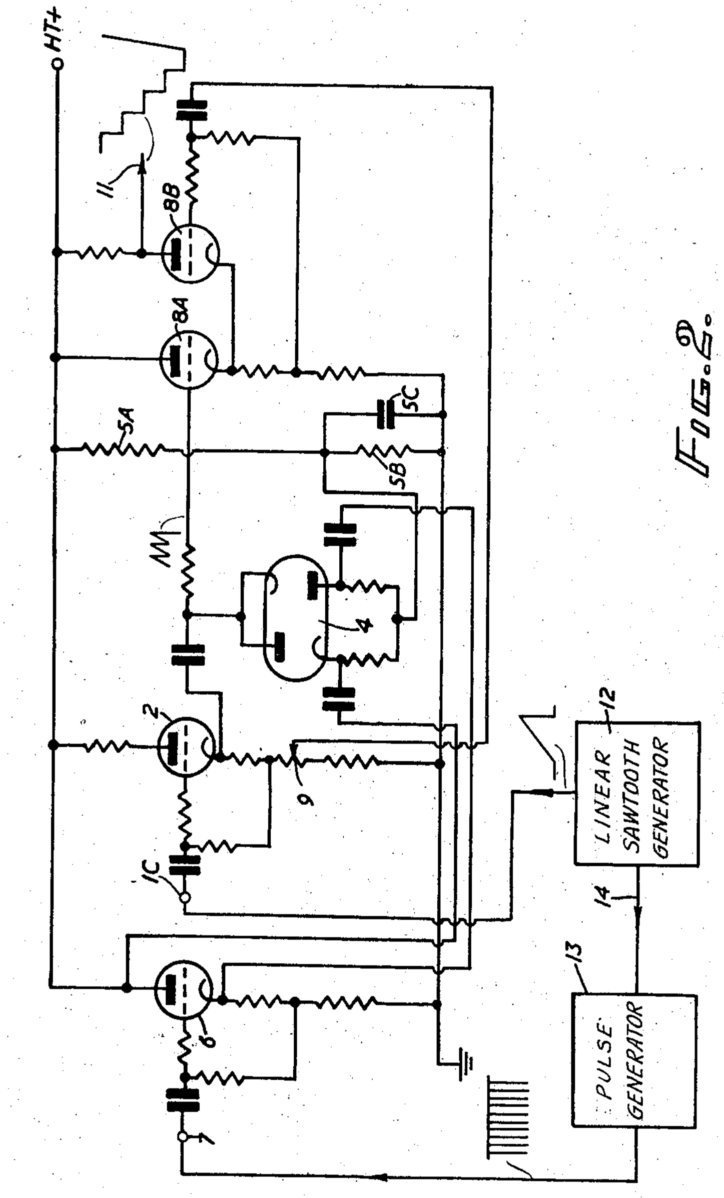

The invention is illustrated in the accompanying drawings in which Fig. 1 shows one embodiment of the invention as applied to the removal or reduction of low frequency interference or distortion in a television signal; and Fig. 2 shows one embodiment of the invention as applied to a step-wave generator.

Referring to Fig. 1, block 1 represents a video amplifier stage in a television signal channel the input lead of which is marked 1B and the output lead of which is marked 1A. The television signal, including low frequency interference or distorting signals (such as mains hum) as low frequency amplitude modulation thereof is tapped-off from the output lead 1A at 1C and fed to the control grid of a cathode follower valve 2. Typical wave forms are shown conventionally at various parts of the circuit, it being assumed, for the sake of simplicity, that the interference to be dealt with is due to mains hum only. One output from the cathode circuit of valve 2 is taken to a further cathode follower valve 3, the control grid potential of which is periodically clamped one per television scanning line during the blanking period by a clamp circuit comprising a double diode valve 4 connected in manner well known per se and deriving a reference D.C. bias potential from a point on a potentiometer comprising elements 5A and 5B and connected between HT and earth. A condenser 5C is connected between said point and earth. Clamp driving pulses for each half of valve 4 are taken from the anode and cathode circuits respectively of a phase-splitter valve 6, to the control grid of which are fed clamping pulses at line frequency, from terminal 7. The source of said clamping pulses is not shown but it may be any of the suitable sources available in a normal television system.

Output from valve 3, consisting of the clamped television signal, is fed to the control grid of a valve 8A and the unclamped television signal, from an adjustable tap 9 on a potentiometer in the cathode circuit of valve 2, is fed to the control grid of a valve 8B. Valves 8A and 8B are connected together as a cathode coupled pair and constitute a subtracting detector circuit such that, when tap 9 is adjusted so that the signal amplitude at the anode of valve 8B is equal to that at the anode of 8A, television signal components are cancelled out leaving interference signal components only, in the form of steps at line frequency, at the anode of valve 8B.

The stepped, detected interference signal is smoothed in a smoothing network 10 which smooths out the steps and gives a resultant waveform which closely resembles the original interference signal waveform. After smoothing, the detected signal is fed back to the input side of amplifier 1. There is only a very small amount of phase shift in the detector circuit and accordingly no additional phase shifting network will normally be required in the feed-back line.

It is desirable that the time constants of the A.C. couplings to valves 8A and 8B be as nearly as possible identical in order that the detector output shall be only interference signal components and unaffected by changes in picture content.

The invention is, of course, not limited to the particular circuit shown in Fig. 1. For example the cathode follower 3 could be omitted and the clamped signal fed directly to the control grid of valve 8A and the input to valve 8B D.C. restored by any of a number of well known expedients. If this is done the couplings to valves 8A and 8B need not be alike but, of course, the D.C. restoring circuit will be affected to some degree by any impulsive noise which may be present and is of the same polarity as the synchronizing pulses.

The arrangement of Fig. 1 requires very little modification to provide a step-wave form generator and one such generator in accordance with the invention and adapted to provide a linear step-wave form output is shown in Fig. 2. The parts of the circuit between terminals 1C and 7 and the output of valve 8B of Fig. 2 are the same as in Fig. 1 except that the clamped signals from double-diode 4 are taken directly to the control grid of valve 8A, valve stage 3 being omitted.

A source of linear, sawtooth oscillations 12 is connected to terminal 1C and a source of pulses 13 having a frequency which is an integral multiple of that of source 12 and locked thereto by locking pulses fed along lead 14, is connected to terminal 7. The operation of the circuit is generally similar to that of Fig. 1 the output from valve 8B being a linear stepped wave. As will be apparent, this simple generator may be easily arranged by slight adjustments or modifications to either of sources 12 and 13 or both, to give a large range of different step-wave outputs of various "staircase" shapes and time-periods.

We claim:

1. A circuit arrangement for reducing undesired low frequency interference or distortion in a signal of substantially higher frequency comprising an amplifier system having an input and output circuit, a demodulating circuit connected with said amplifier system for producing a signal representative of low frequency amplitude modulation present upon a signal of higher frequency, means for periodically clamping the modulated signal, means for subtractively combining the modulated signal with said clamped signal to produce a resultant stepped signal, means for smoothing the stepped waveform produced by the demodulating arrangement to smooth out the steps therein and means for feeding back the smoothed signal to the input of said amplifier system so as substantially to cancel out the distortion or interference.

2. A circuit arrangement as set forth in claim 1 wherein said combining means comprises two thermionic valves connected as a cathode coupled pair, the modulated signal being fed to a control electrode of one valve and the clamped signal being fed to a control electrode of the other valve, the stepped, resultant signal being taken-off from the anode circuit of one of the valves.

3. A circuit arrangement as set forth in claim 1 wherein the signal of substantially higher frequency is a television signal and the clamping means in the demodulating arrangement is operated by line-frequency synchronizing pulses obtained from the television signals.

References Cited in the file of this patent

UNITED STATES PATENTS

| | | |
|---|---|---|
| 2,286,450 | White et al. | June 16, 1942 |
| 2,412,994 | Lehmann | Dec. 24, 1946 |
| 2,425,315 | Atwood et al. | Aug. 12, 1947 |
| 2,480,201 | Selove | Aug. 30, 1949 |
| 2,502,454 | Grieg | Apr. 4, 1950 |
| 2,532,450 | Hings | Dec. 5, 1950 |
| 2,632,845 | Goldberg | Mar. 24, 1953 |